Sept. 13, 1955     E. G. STEFFEN     2,717,777
PRESSURE REGULATOR
Filed June 7, 1950

INVENTOR.
ELMER G. STEFFEN
BY
Woodling and Kroet,
attys.

United States Patent Office 2,717,777
Patented Sept. 13, 1955

2,717,777
PRESSURE REGULATOR

Elmer G. Steffen, University Heights, Ohio, assignor to Alar Products, Inc., a corporation of Ohio Application June 7, 1950, Serial No. 166,675

7 Claims. (Cl. 267—1)

The invention relates in general to variable pressure regulators and more particularly to pressure regulating devices for exerting a variable force upon a flexible diaphragm. The invention is, in a specific embodiment thereof, directed to a pressure breathing cap for use with a pressure breathing type of diluter demand oxygen regulator. The demand oxygen regulator has a flexible diaphragm at one end thereof positioned above and covering a regulating chamber; and the user of the oxygen system, by inhaling, will evacuate this regulating chamber, thus causing the diaphragm to collapse. By so doing an oxygen valve is opened to admit oxygen to this regulating chamber under pressure, and the force thereof will again restore the diaphragm to the normal position. The pressure breathing cap fits on the opposite side of this flexible diaphragm and has a manually operable knob to adjust the tension of a spring which, through a linkage system, exerts a variable mechanical force on the upper side of this diaphragm. The demand regulator mixes oxygen with air in ever increasing proportion until about 35,000 feet is reached, at which time the user is breathing 100 per cent pure oxygen. The pressure breathing cap is used at altitudes above about 35,000 feet in order to supply oxygen under increasing pressures sufficient to maintain the same oxygen concentration in his body as when he is breathing pure oxygen from the demand regulator at an altitude of about 35,000 feet.

An object of the invention is to provide a pressure breathing cap for a demand oxygen regulator wherein a torsion spring is wound up and exerts a varying force through a system of levers onto a flexible diaphragm of the demand oxygen regulator.

Another object of the invention is to provide a variable pressure regulator having a torsion spring adapted to have one end manually rotated and the other end connected through a system of levers so that a portion of the lever moves along a path substantially parallel to the axis of the torsion spring.

Still another object of the invention is to provide a pressure regulating device for a flexible diaphragm wherein a housing carries a hollow shaft containing an axially aligned torsion spring and also carrying a central shaft with an end cap journaled to this central shaft, and with the torsion spring acting between the hollow shaft and the end cap wherein a bell crank lever transmits the force of the torsion spring to the diaphragm.

Other objects and a fuller understanding of the invention may be had by referring to the following description and claims, taken in conjunction with the accompanying drawing, in which:

Figure 1:
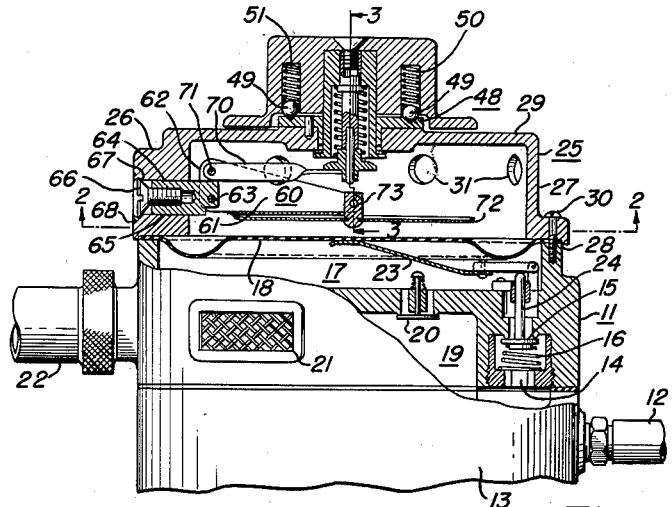
Figure 1 is a side elevation view partially in section of a demand oxygen regulator having a flexible diaphragm and covered by a pressure breathing cap.
Figure 2:
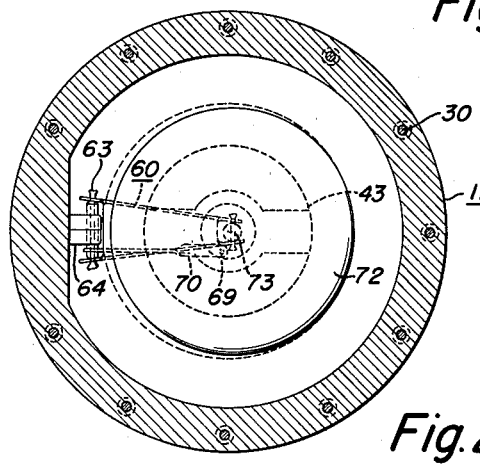
Figure 2 is a sectional view taken along the line 2—2 of Figure 1.
Figure 3:
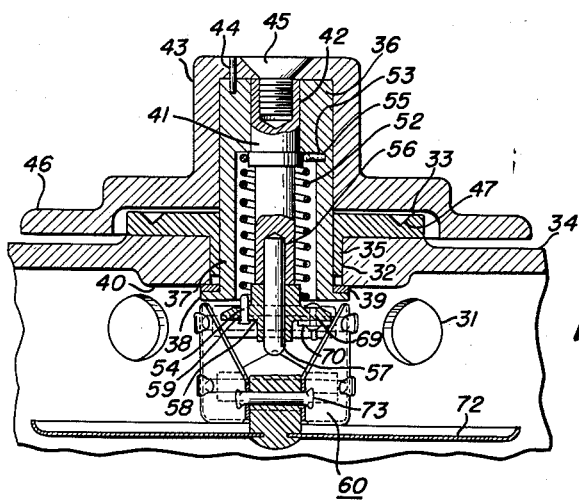
Figure 3 is an enlarged sectional view taken on the line 3—3 of Figure 1.

The Figures 1, 2 and 3 illustrate the preferred form of the invention wherein the reference character 11 denotes a diluter demand oxygen regulator having an oxygen inlet 12 at high pressure to a first stage pressure regulator 13. An outlet 14 of the first stage is provided at a reduced pressure in the order of 5 or 10 pounds per square inch to a second stage valve 15. The second stage valve 15 is closed by a valve spring 16 and the gas pressure on the underside of the valve 15. The oxygen flowing through the second stage valve 15 enters a regulating chamber 17 covered by a flexible diaphragm 18. Oxygen from the regulating chamber 17 then flows to a mixing chamber 19 through an oxygen metering port 20 regulated by mechanism not shown. In the mixing chamber 19 the oxygen coming from the regulating chamber 17 is mixed with air entering from the screened port 21 and thence goes to the outlet 22 of the regulator 11. As the user inhales, this tends to evacuate the mixing chamber 19 and likewise the regulating chamber 17 which tends to move the flexible diaphragm 18 downwardly. A regulating lever 23 is thus moved to move a valve stem 24 to open the second stage valve 15. This admits oxygen to the regulating chamber 17 to again restore the diaphragm 18 to its normal position such as is shown in the Figure 1. The mechanism not shown in the mixing chamber 19 of the regulator 11 automatically changes the proportions of air and oxygen in accordance with atmospheric pressure until an atmospheric pressure corresponding to about 35,000 feet above sea level is attained. At this altitude 100 per cent oxygen is being delivered and the screened air port 21 is completely blocked off. Above about 35,000 feet a pressure breathing cap 25 comes into play. The purpose of the pressure breathing cap 25 is to exert a variable force upon the upper side of the flexible diaphragm 18, thereby tending to open the second stage valve 15 against the urging of the gas pressure within the regulating chamber 17. Thus, at altitudes above 35,000 feet the pressure breathing cap 25 permits oxygen under slight pressure to be delivered to the user.

The pressure breathing cap 25 comprises a circular cup-shaped housing 26 having an annular side wall 27, a circular open end 28 and a circular closed end 29. The open end 28 is adapted to engage the periphery of the upper side of the flexible diaphragm 18 and be fastened thereto by any suitable means, such as the screws 30. The annular side wall 27 has a plurality of apertures 31 so that the upper side of the diaphragm 18 is open to atmosphere. Centrally disposed in the closed end 29 is an aperture 32. A detent plate 33 is fixedly fastened to the upper side 34 of the closed end 29. The detent plate 33 has a bearing portion 35 extending within the aperture 32. A hollow shaft 36 is journaled within the bearing portion 35 and extends both within and without the cup-shaped housing 26. The lower end 37 of the hollow shaft 36 has a flange 38. A thrust washer 39 is disposed between the flange 38 and the underside 40 of the closed end 29. A central shaft 41 has a press fit with an aperture 42 in the hollow shaft 36 to thus make essentially a single unit of these two shafts. A knob 43 is fastened to the upper end of the hollow shaft 36 by a pin 44 and a screw 45. The knob 43 carries a flange 46 which may have indicia thereon cooperating with other indicia on the upper side 34 to thereby indicate the position of the knob 43 relative to the housing 26.

The detent plate 33 has a plurality of conical holes 47. A detent mechanism 48 is provided between the knob 43 and the housing 26 which includes the conical holes 47 and balls 49 cooperating therewith. The two balls 49 are contained within recesses 50 in the knob 43 and the balls are urged downwardly by springs 51. This detent mechanism 48 permits the knob 43 to be selectively retained in any one of a plurality of positions relative to the housing 26.

A torsion spring 52 is disposed in the space between the hollow shaft 36 and the central shaft 41. The torsion spring 52 has first and second ends 53 and 54. The first end 53 extends substantially at right angles to the axis of the spring 52 and engages an aperture 55 in the hollow shaft 36. The second end 54 of the spring 52 extends substantially parallel to the axis of this spring. The central shaft 41 has an axially aligned aperture 56 and a pin 57 is pressed into this aperture 56. An end cap 58 is journaled on this pin 57. The second end 54 of the torsion spring 52 engages a hole 59 in the end cap 58 and is peened over so as to retain the end cap 58 on the pin 57.

A bell crank lever 60 has a long leg 61 and a short leg 62 with a pivot point 63 at the juncture thereof. The pivot point 63 is carried on a hexagonal pin 64 which slidably engages a hexagonal aperture 65 in the annular side wall 27. An adjusting screw 66 abuts a shoulder 67 to adjust the position of the hexagonal pin 64 and then the head of the screw 66 is staked at 68 to hold the entire assembly in place. A pin 69 is carried on the end cap 58 and a link 70 connects this pin 69 with the short leg 62 of the lever 60 at the pivot point 71. A diaphragm plate 72 is pivotally mounted to the free end of the long leg 61 by the pivot 73.

In operation of the pressure regulator below 35,000 feet the knob 43 is rotated to the position shown in Figures 1 and 3 wherein substantially no force is applied to the torsion spring 52, and hence the diaphragm plate 72 is in its uppermost position. The knob is adapted to rotate about 320 degrees through a plurality of positions as determined by the detent mechanism 48. Rotation of the knob in a counterclockwise direction, as viewed in Figure 2, will progressively rotate the first end 53 of the torsion spring 52. This will transmit a rotational force to the second end 54 of this torsion spring 52. Since the second end 54 is displaced from the axis of the spring 52 it will have a tendency to move in an arcuate path. This arcuate path of the second end 54 will move the pin 69 counterclockwise as seen in Figure 2. This will pull the link 70 to the right as seen in the Figures 1 and 2. The link 70 pulls on the short leg 62 of the lever 60 to urge the long leg 61 thereof downwardly, as viewed in Figure 1. The L-shaped lever 60 has long and short legs to give a speed advantage to the movement, and hence the diaphragm plate 72 tends to move downwardly. This downward movement will result in the diaphragm plate 72 contacting the flexible diaphragm 18 to thus actuate the regulating lever 23 and hence tend to open the second stage valve 15. Oxygen pressure will thereby build up inside the regulating chamber 17 sufficient to counteract the force exerted on the diaphragm by the diaphragm plate 72. Thus, this pressure breathing cap 25 offers a manual means to the user of the oxygen supply to vary the pressure of the oxygen supplied him.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pressure regulating device for exerting a variable force along a first path which is substantially straight over a given working range, comprising, a support, a torsion spring having an axis generally parallel to said first path, first means to rotate a first end of said torsion spring relative to said support, detent means acting between said end of said torsion spring and said support to establish said end in one of a plurality of positions relative to said support, a second end on said torsion spring displaced from the axis thereof to thus have a tendency to move in an arcuate path upon rotation of said spring first end, and a bell crank lever connected to said spring second end to translate the force of said spring into a force along said first path.

2. A variable force device, comprising, a housing with an open end and an end wall remote from said open end, said end wall having an aperture, a shaft journaled in said aperture, a detent coacting between said shaft and said housing to establish said shaft in one of a plurality of positions, a revoluble member having an axis disposed coplanar with said shaft, a torsion spring acting between said shaft and said revoluble member, a bell crank lever having long and short legs and a pivot point at the juncture thereof, means for securing said pivot point to said housing with said long leg extending toward the middle of said housing open end, and a relatively stiff tension link extending between the free end of said short leg and said revoluble member.

3. A variable force device, comprising, a cup-shaped housing with an open end and an end wall remote from said open end, said end wall having an aperture, a shaft journaled in said aperture, detent means coacting between said shaft and said housing to establish said shaft in one of a plurality of positions relative to said housing, a revoluble member having an axis coplanar with said shaft, a torsion spring acting between said shaft and said revoluble member, a crank arm on said revoluble member, a bell crank lever having first and second legs and a pivot point at the juncture thereof, means for securing said pivot point to said housing, and a link extending between the free end of said second leg and said crank arm.

4. A variable force device, comprising, a cup-shaped housing with an open end and an end wall remote from said open end, said end wall having an aperture, a shaft journaled in said aperture, detent means coacting between said shaft and said housing to establish said shaft in one of a plurality of positions relative to said housing, a revoluble member having an axis coplanar with said shaft, a torsion spring acting between said shaft and said revoluble member, a crank arm on said revoluble member, a bell crank lever having long and short legs and a pivot point at the juncture thereof, means for adjustably securing said pivot point to the interior side wall of said housing with said long leg extending substantially to the center of said housing and said short leg extending toward said housing end wall, and a link extending between the free end of said short leg and said crank arm.

5. A variable force device, comprising, a cup-shaped housing with an open end, and an end wall remote from said open end, said end wall having a central aperture, a shaft journaled in said aperture, detent means acting between said shaft and said housing to establish said shaft in one of a plurality of positions relative to said housing, a revoluble member coaxial with said shaft, one of said shaft and revoluble member being hollow to receive the other thereof with an annular space therebetween, a torsion spring disposed in said space and coacting between said shaft and said revoluble member, lever means pivotally carried by said housing, and a relatively stiff link interconnecting said revoluble member and said lever.

6. A pressure regulating device comprising, a cup-shaped housing with an annular side wall and a circular closed end and a circular open end, said closed end having inner and outer surfaces and a central aperture, a hollow shaft journaled in said aperture, a knob fastened to said shaft externally of said housing, detent means to establish said knob and hence said hollow shaft in one of a plurality of positions relative to said housing, a central shaft axially disposed within said hollow shaft, a torsion spring having first and second ends and disposed in the space between said hollow shaft and said central shaft, an end cap axially aligned with and journaled relative to said hollow shaft and disposed within said housing, means for connecting said spring first end to said hollow shaft, means for connecting said spring second end to said end cap, a pin on said end cap, a bell crank lever having long and short legs and a pivot point at the juncture thereof, means for adjustably securing said pivot point to the interior of the annular side wall of said housing with said long leg extending substantially to the axis of said housing and said short leg extending toward said housing closed end, and a link extending between the free end of said short leg and said end cap pin.

7. A variable force device, comprising a housing, said housing having an aperture, a shaft journaled in said aperture, a detent coacting between said shaft and said housing to establish said shaft in one of a plurality of positions, a revoluble member having an axis disposed coplanar with said shaft, a torsion spring acting between said shaft and said revoluble member, a bell crank lever having long and short legs and a pivot point at the juncture thereof, means for securing said pivot point to said housing, and a relatively stiff tension link extending between the free end of said short leg and said revoluble member.

References Cited in the file of this patent

UNITED STATES PATENTS

| | | |
|---|---|---|
| 1,333,993 | Oliver | Mar. 16, 1920 |
| 1,987,316 | Zimmer | Jan. 8, 1935 |
| 2,270,951 | Jeffrey | Jan. 27, 1942 |
| 2,357,781 | Randol | Sept. 5, 1944 |
| 2,446,638 | Crumrine | Aug. 10, 1948 |
| 2,521,310 | Roth | Sept. 5, 1950 |
| 2,523,906 | Holmes | Sept. 26, 1950 |
| 2,545,707 | Roth | Mar. 20, 1951 |
| 2,597,961 | Steffen | May 27, 1952 |

FOREIGN PATENTS

| | | |
|---|---|---|
| 144,097 | Austria | Dec. 27, 1935 |
| 562,686 | Great Britain | July 12, 1944 |